(12) United States Patent
Ishiguro

(10) Patent No.: US 11,870,248 B2
(45) Date of Patent: Jan. 9, 2024

(54) SEMICONDUCTOR DEVICE

(71) Applicant: Kioxia Corporation, Tokyo (JP)

(72) Inventor: Shigefumi Ishiguro, Yokohama (JP)

(73) Assignee: Kioxia Corporation, Tokyo (JP)

( * ) Notice: Subject to any disclaimer, the term of this patent is extended or adjusted under 35 U.S.C. 154(b) by 116 days.

(21) Appl. No.: 17/695,548

(22) Filed: Mar. 15, 2022

(65) Prior Publication Data

US 2023/0085217 A1    Mar. 16, 2023

(30) Foreign Application Priority Data

Sep. 14, 2021 (JP) .................. 2021-149577

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC .............................. H02H 9/046; H02H 1/0007
USPC .......................................................... 361/56
See application file for complete search history.

(56) References Cited

U.S. PATENT DOCUMENTS

| | | | | |
|---|---|---|---|---|
| 6,140,834 A | * | 10/2000 | Takahashi | H03K 19/018528 327/52 |
| 6,249,410 B1 | * | 6/2001 | Ker | H02H 9/046 361/111 |
| 9,001,478 B2 | * | 4/2015 | Ker | H03M 1/361 361/56 |
| 10,482,977 B2 | * | 11/2019 | Shiraishi | G11C 5/143 |
| 2003/0107424 A1 | * | 6/2003 | Huang | H03K 17/08122 327/310 |
| 2003/0223166 A1 | * | 12/2003 | Chen | H01L 27/0266 361/56 |
| 2004/0264080 A1 | * | 12/2004 | Yang | H02H 9/046 361/56 |
| 2008/0247104 A1 | * | 10/2008 | Kwak | H01L 27/0292 361/56 |
| 2009/0135534 A1 | * | 5/2009 | Ishii | H01L 27/0251 361/91.1 |
| 2009/0180224 A1 | * | 7/2009 | Ker | H01L 27/0262 361/56 |

(Continued)

FOREIGN PATENT DOCUMENTS

JP      2019-54370 A        4/2019
TW      201320292 A    *    5/2013

*Primary Examiner* — Dharti H Patel
(74) *Attorney, Agent, or Firm* — Oblon, McClelland, Maier & Neustadt, L.L.P.

(57) ABSTRACT

A semiconductor device includes first and second protection circuits. The first protection circuit includes a timer circuit, a voltage detection circuit, and a discharge element. The second protection circuit includes a discharge circuit. The timer circuit is connected between a first pad on a power supply potential side and a second pad on a reference potential side. The voltage detection circuit is connected between the first and second pads on an output side of the timer circuit. The discharge element is connected between the first and second pads on an output side of the voltage detection circuit. The discharge circuit is connected between a third pad on the power supply potential side and a fourth pad on the reference potential side on the output side of the timer circuit.

13 Claims, 7 Drawing Sheets

(56) References Cited

U.S. PATENT DOCUMENTS

| | | | |
|---|---|---|---|
| 2009/0237846 A1* | 9/2009 | Lin | H02H 9/046 |
| | | | 257/E21.616 |
| 2011/0205673 A1* | 8/2011 | Okushima | H03K 19/003 |
| | | | 361/56 |
| 2013/0114170 A1* | 5/2013 | Chen | H02H 9/046 |
| | | | 361/56 |
| 2016/0064926 A1* | 3/2016 | Huang | H02H 9/046 |
| | | | 361/56 |
| 2017/0047916 A1* | 2/2017 | Narita | H03K 5/08 |
| 2020/0035670 A1* | 1/2020 | Tsai | H02H 9/046 |
| 2022/0102970 A1* | 3/2022 | Wang | H02H 9/046 |
| 2023/0009631 A1* | 1/2023 | Zhu | H02H 9/046 |
| 2023/0136979 A1* | 5/2023 | Zhu | H03K 17/0822 |
| | | | 361/56 |

* cited by examiner

US 11,870,248 B2

SEMICONDUCTOR DEVICE

CROSS REFERENCE TO RELATED APPLICATIONS

This application is based upon and claims the benefit of priority from the prior Japanese Patent Application No. 2021-149577, filed on Sep. 14, 2021, the entire contents of which are incorporated herein by reference.

FIELD

Embodiments of the present invention relate to a semiconductor device.

BACKGROUND

In a semiconductor device provided with an ESD (electrostatic discharge) protection circuit that protects a protected circuit from static electricity, size reduction of the ESD protection circuit has been demanded in association with reduction in chip size.

DETAILED DESCRIPTION

A semiconductor device according to an embodiment comprises a first protection circuit and a second protection circuit for protecting a protected circuit. The first protection circuit includes a timer circuit, a voltage detection circuit, and a discharge element. The second protection circuit includes a discharge circuit. The timer circuit is connected between a first pad connected to a power supply potential and a second pad connected to a reference potential and configured to output a control signal for controlling operation periods of the first protection circuit and the second protection circuit. The voltage detection circuit is connected between the first pad and the second pad on an output side of the timer circuit and configured to operate based on the control signal and output a discharge instruction signal when a voltage between the first pad and the second pad exceeds a first threshold voltage. The discharge element is connected between the first pad and the second pad on an output side of the voltage detection circuit and configured to discharge from the first pad to the second pad in response to the discharge instruction signal. The discharge circuit is connected between a third pad connected to the power supply potential and a fourth pad connected to the reference potential on the output side of the timer circuit and configured to discharge from the third pad to the fourth pad when a voltage between the third pad and the fourth pad exceeds a second threshold voltage.

Embodiments of the present invention will be explained below with reference to the drawings. In FIGS. 1 to 5, identical or similar constituents are denoted by like reference signs and redundant explanations thereof are omitted.

First Embodiment

Figure 1:
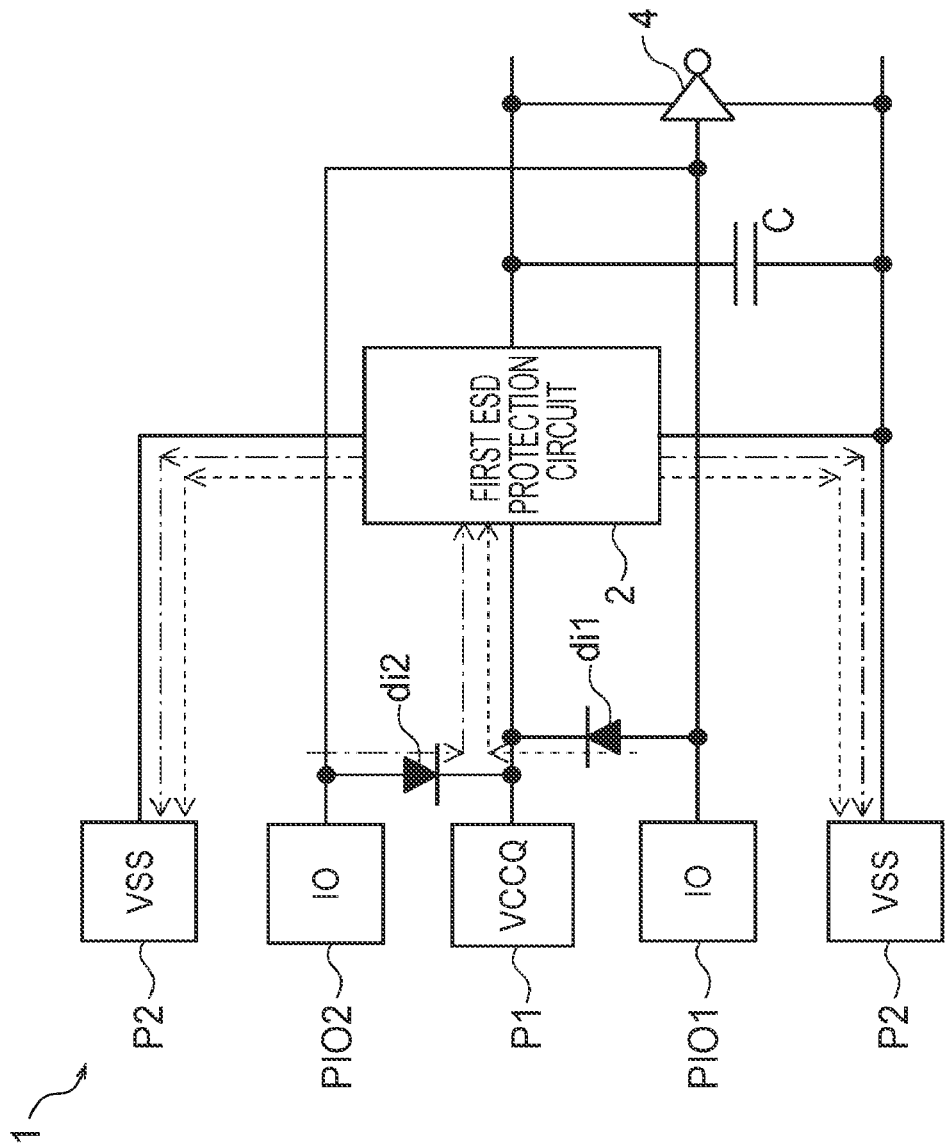
FIG. 1 is a circuit diagram of a semiconductor device according to a first embodiment.
Figure 2:
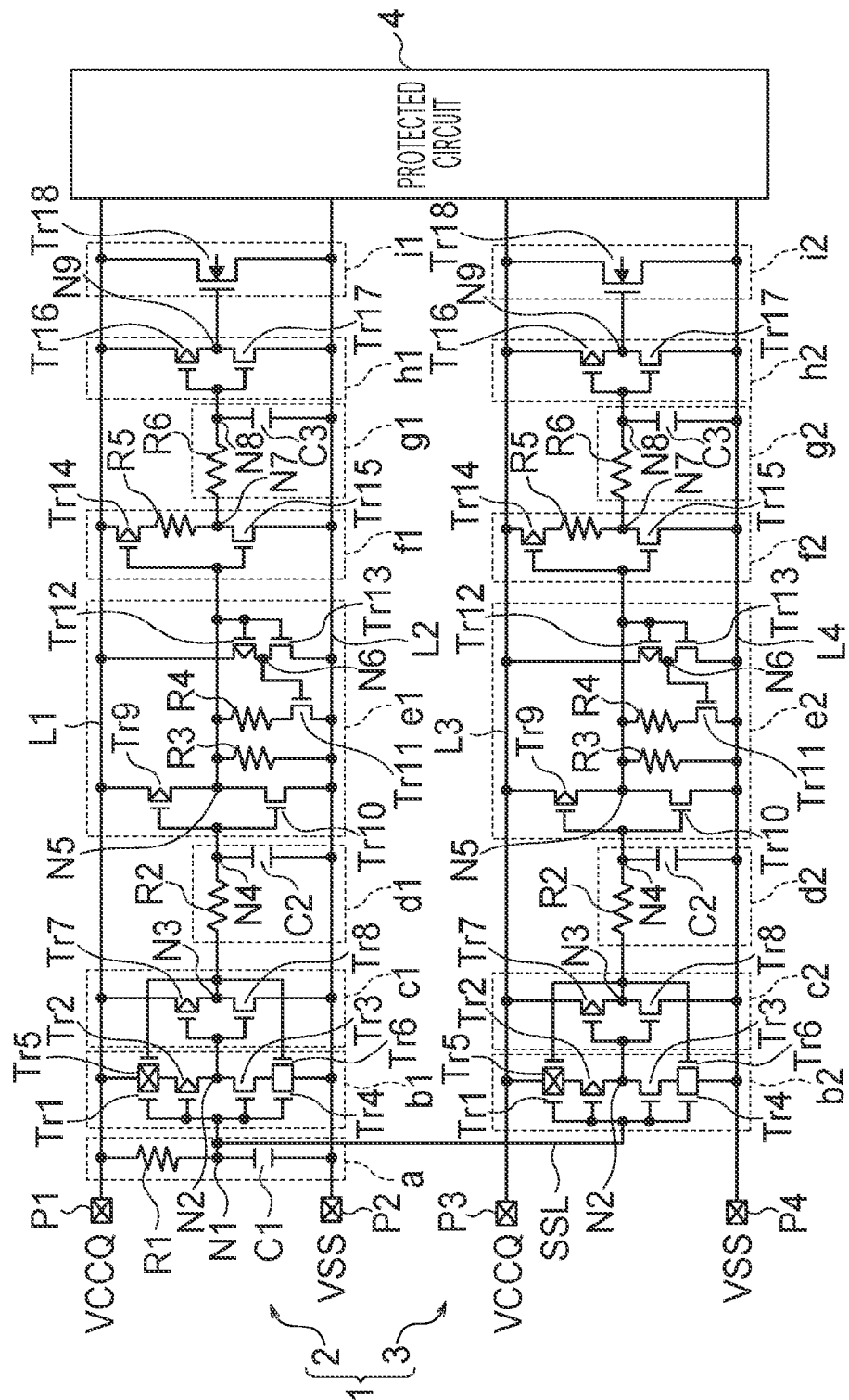
FIG. 2 is a circuit diagram of a first ESD protection circuit and a second ESD protection circuit in the semiconductor device according to the first embodiment.

FIG. 1 is a circuit diagram of a semiconductor device 1 according to a first embodiment. FIG. 2 is a circuit diagram of a first ESD protection circuit 2 and a second ESD protection circuit 3 in the semiconductor device 1 according to the first embodiment. The semiconductor device 1 according to the first embodiment can be applied to, for example, a NAND flash memory. As illustrated in FIG. 1, the semiconductor device 1 according to the first embodiment includes the first ESD protection circuit 2, a first pad P1, a pair of second pads P2 and P2, a first input/output pad PIO1, a second input/output pad PIO2, a first diode di1, a second diode di2, a capacitor C, and a protected circuit 4. Further, as illustrated in FIG. 2 and FIG. 5B described later, the semiconductor device 1 includes the second ESD protection circuit 3, a third pad P3, a pair of fourth pads P4 and P4, a third input/output pad PIO3, and a fourth input/output pad PIO4.

Figure 5A:
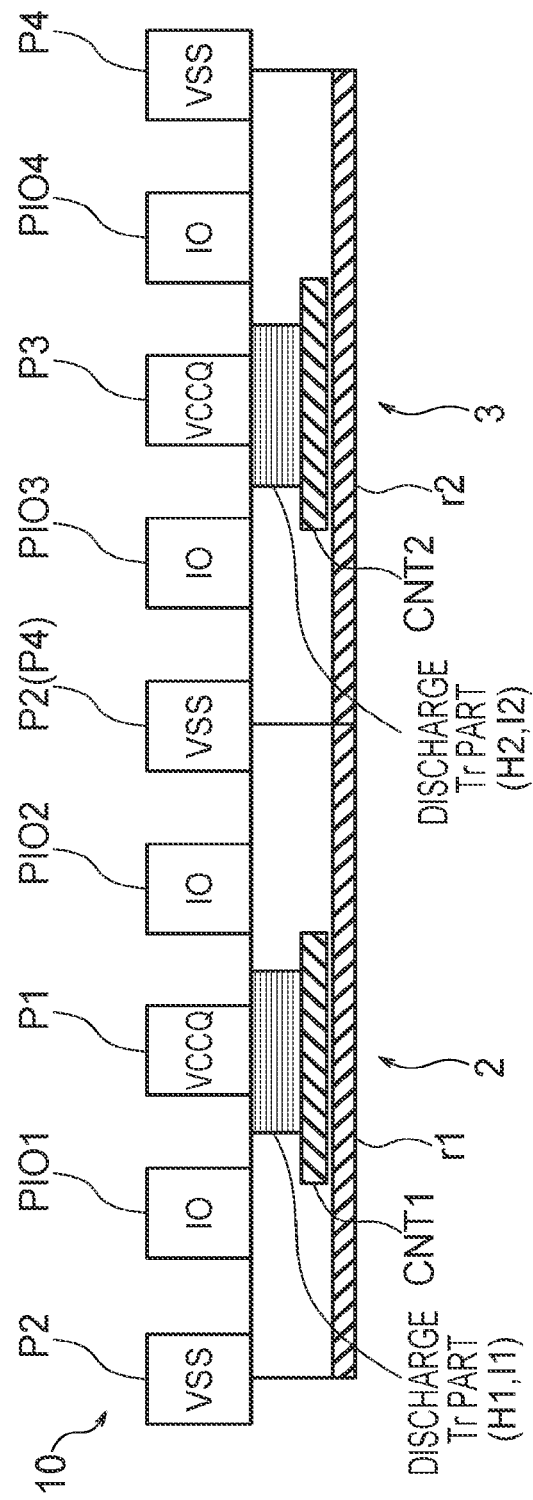
FIG. 5A is a schematic cross-sectional view illustrating the layout of a first ESD protection circuit and a second ESD protection circuit in a semiconductor device according to a comparative example of the third embodiment.
Figure 5B:
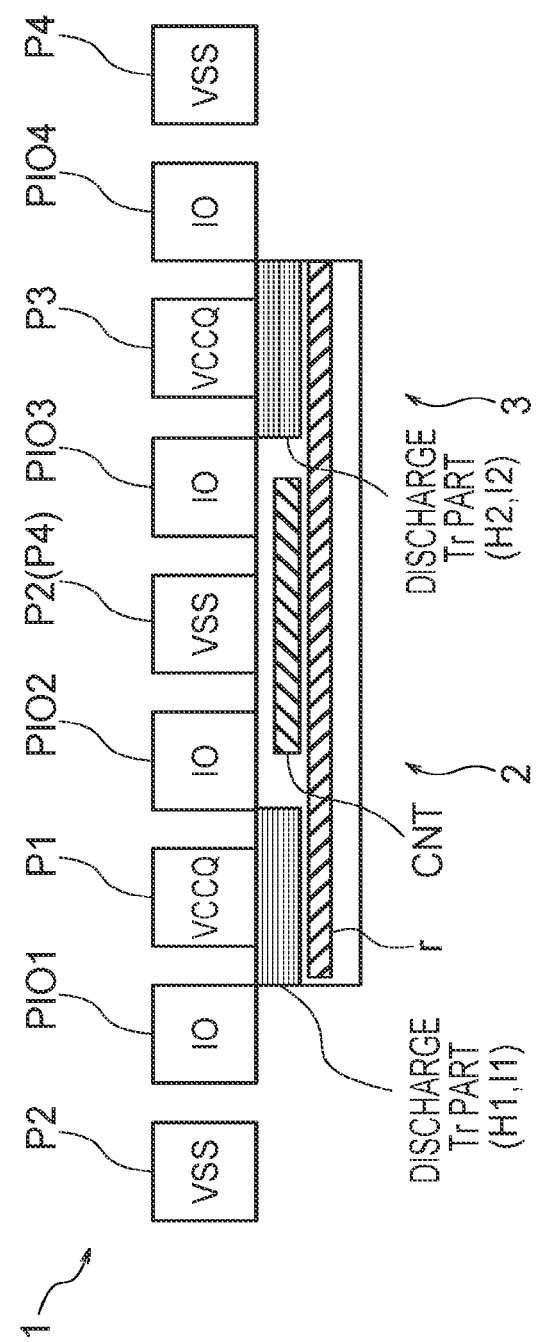
FIG. 5B is a schematic cross-sectional view illustrating the layout of the first ESD protection circuit and the second ESD protection circuit in the semiconductor device according to the third embodiment.

In the example illustrated in FIG. 5B, one of the pair of second pads P2 and P2 and one of the pair of fourth pads P4 and P4 are common. Actually, all the pair of second pads P2 and P2 and pair of fourth pads P4 and P4 (that is, VSS pads) are connected to one another by a power line. However, in an ESD test, the shortest discharge path (that is, a surge path) from an ESD protection circuit passes through a pair of VSS pads arranged near an application pad (an input/output pad). Meanwhile, an effect of discharge to the VSS pads arranged to be far from the application pad is small. FIG. 2 illustrates only one of the pair of second pads P2 and P2. The other second pad P2, the illustration of which is omitted in FIG. 2, is connected to the second pad P2 illustrated in FIG. 2 by a power line in such a manner that the shortest discharge path from the first ESD protection circuit 2 passes through the other second pad P2 in an ESD test using the first input/output pad PIO1 or the second input/output pad P1O2 as the application pad, as with the second pad P2 illustrated in FIG. 2. Illustrations of the first input/output pad PIO1 and the second input/output pad PIO2 are omitted in FIG. 2. Further, FIG. 2 illustrates only one of the pair of fourth pads P4 and P4. The other fourth pad P4, the illustration of which is omitted in FIG. 2, is connected to the fourth pad P4 illustrated in FIG. 2 by a power line in such a manner that the shortest discharge path from the second ESD protection circuit 3 passes through the other fourth pad P4 in an ESD test using the third input/output pad PIO3 or the fourth input/output pad PIO4 as the application pad, as with the fourth pad P4 illustrated in FIG. 2. Illustrations of the third input/output pad PIO3 and the fourth input/output pad PIO4 are omitted in FIG. 2.

The first ESD protection circuit 2 and the second ESD protection circuit 3 are for protecting the protected circuit 4 from a surge. The first ESD protection circuit 2 and the second ESD protection circuit 3 are, for example, RCTMOS (Resistance Capacitor Triggered Metal Oxide Semiconductor) circuits. The protected circuit 4 may be, for example, an inverter included in an interface circuit connected to a memory core. The interface circuit performs data transmission and reception between the input/output pads PIO1 to PIO4 and the memory core, for example. Details of the first and second ESD protection circuits 2 and 3 will be described later.

The first pad P1 is connected to a power supply potential (VCCQ). The first pad P1 is connected to the input side of the first ESD protection circuit 2. The first pad P1 is connected to the protected circuit 4 via a first power supply line L1. The second pad P2 is connected to a reference potential (VSS). The second pad P2 is connected to the protected circuit 4 via a second power supply line L2. The reference potential is 0 [V], for example. The second pad P2 is connected to the output side of the first ESD protection circuit 2. The first input/output pad PIO1 is connected to the input side of the first ESD protection circuit 2 via the first diode di1. The second input/output pad PIO2 is connected to the input side of the first ESD protection circuit 2 via the second diode di2. The capacitor C is connected between the first pad P1 and the second pad P2.

In the semiconductor device 1 having the above-described configuration, when a surge is applied to the first input/output pad PIO1 in an ESD test, the surge is distributed from the first input/output pad PIO1 to the pair of second pads P2 via the first diode di1 and the first ESD protection circuit 2 and is discharged mainly in accordance with the shortest discharge path illustrated by a broken arrow in FIG. 1. At this time, there is almost no discharge to the fourth pads P4 located far from the first input/output pad PIO1. Further, when a surge is applied to the second input/output pad PIO2 in an ESD test, the surge is distributed from the second input/output pad PIO2 to the pair of second pads P2 via the second diode di2 and the first ESD protection circuit 2 and is discharged mainly in accordance with the shortest discharge path illustrated by a dashed-dotted arrow in FIG. 1. At this time, there is almost no discharge to the fourth pads P4 located far from the second input/output pad PIO2. Accordingly, the protected circuit 4 can be protected from the surge. The discharge paths illustrated by the broken arrow and the dashed-dotted arrow illustrated in FIG. 1 are discharge paths when an ESD test is performed by connecting the second pads P2 to ground and applying a positive voltage to an application pad (the first input/output pad PIO1 or the second input/output pad PIO2), but do not represent discharge paths in all ESD tests. Further, the second ESD protection circuit 3 can protect the protected circuit 4 from a surge by discharge in an identical manner to the first ESD protection circuit 2, although the illustrations are omitted in FIG. 1.

Next, detailed configurations of the first ESD protection circuit 2 and the second ESD protection circuit 3 are described. FIG. 2 is a circuit diagram of the first ESD protection circuit 2 and the second ESD protection circuit 3 in the semiconductor device 1 according to the first embodiment.

The first ESD protection circuit 2 includes a timer circuit a, a first noise filter circuit b1, a first buffer circuit c1, a second noise filter circuit d1, a first voltage detection circuit e1, a second buffer circuit f1, a third noise filter circuit g1, a third buffer circuit h1, and a first discharge element i1. Further, a diode may be connected to the output side of the first discharge element i1 in such a manner that its forward direction is a direction from the second pad P2 to the first pad P1.

First, the timer circuit a, the first voltage detection circuit e1, and the first discharge element i1 are described in detail.

The timer circuit a is connected between the first pad P1 connected to a power supply potential (VCCQ) and the second pad P2 connected to a reference potential (VSS). In more detail, the timer circuit a includes a resistor R1 and a capacitor C1 as illustrated in FIG. 2. The resistor R1 is connected to the first pad P1 at one end and to an output node N1 at the other end. The capacitor C1 is connected to the output node N1 at one end and to the second pad P2 at the other end. The timer circuit a is shared between the first ESD protection circuit 2 and the second ESD protection circuit 3 and outputs a control signal for controlling operating periods of both the first ESD protection circuit 2 and the second ESD protection circuit 3. In more detail, the resistor R1 and the capacitor C1 function as a trigger circuit that operates based on a time constant determined by a resistance value of the resistor R1 and a capacitance value of the capacitor C1. The voltage at the output node N1 which indicates a signal value of the control signal follows a fluctuation of a power-supply voltage at the first pad P1 with a time delay based on the time constant. Such a trigger circuit is also called "RC timer".

The first voltage detection circuit e1 is connected between the first pad P1 and the second pad P2 on the output side of the timer circuit a. In more detail, the first voltage detection circuit e1 includes transistors Tr9, Tr10, Tr11, Tr12, and Tr13 and resistors R3 and R4 as illustrated in FIG. 2. The transistor Tr9 is connected to the first pad P1 at one end, to an output node N5 at the other end, and to the output node N1 side at its gate. The transistor Tr9 is a pMOSFET in the example illustrated in FIG. 2. The transistor Tr10 is connected to the output node N5 at one end, to the second pad P2 at the other end, and to the output node N1 side at its gate. The transistor Tr10 is different from the transistor Tr9 in the conductivity type. The transistor Tr10 is an nMOSFET in the example illustrated in FIG. 2. The resistor R3 is connected to between the output node N5 and the end of the resistor R4 at one end and to the second pad P2 at the other end. The resistor R4 is connected to the output node N5 at one end and to one end of the transistor Tr11 at the other end. The transistor Tr11 is connected to the output node N5 via the resistor R4 at one end, to the second pad P2 at the other end, and to an output node N6 at its gate. The transistor Tr11 is an nMOSFET in the example illustrated in FIG. 2. The transistor Tr12 is connected to the first pad P1 at one end, to the output node N6 at the other end, and to the output node N5 at its gate. The transistor Tr12 is a pMOSFET in the example illustrated in FIG. 2. The transistor Tr13 is connected to the output node N6 at one end, to the second pad P2 at the other end, and to the output node N5 at its gate. The transistor Tr13 is different from the transistor Tr12 in the conductivity type. The transistor Tr13 is an nMOSFET in the example illustrated in FIG. 2. The transistor Tr11 has a different impedance from the transistor Tr9. When both the transistors Tr9 and Tr11 are on, the output voltage of the first voltage detection circuit e1, for example, may be determined based on a magnitude ratio of the impedance of the transistor Tr9 and a combined impedance of the resistance R4 and the transistor Tr11. The first voltage detection circuit e1 is configured by a ratio circuit whose output varies depending on a variation of the power-supply voltage, for example. The first voltage detection circuit e1 operates based on a control signal from the timer circuit a. The first voltage detection circuit e1 outputs a discharge instruction signal when a voltage between the first pad P1 and the second pad P2 exceeds a first threshold voltage. The first voltage detection circuit e1 does not output a discharge instruction signal when a voltage between the first pad P1 and the second pad P2 does not exceed the first threshold voltage. The first threshold voltage has a voltage value at which it can be determined whether a surge is applied, for example. Specifically, it is desirable that the first threshold voltage has a voltage value that is equal to or larger than a value of a voltage supplied to the protected circuit 4 during a normal operation and is smaller than a voltage value at which the protected circuit 4 may be broken. The discharge instruction signal is, for example, a high-level voltage.

The first discharge element i1 is connected between the first pad P1 and the second pad P2 on the output side of the first voltage detection circuit e1. In more detail, the first discharge element it includes a transistor Tr18 connected to the first pad P1 at one end, to the second pad P2 at the other end, and to the output node N5 side at its gate as illustrated in FIG. 2. The transistor Tr18 is an nMOSFET in the example illustrated in FIG. 2. The first discharge element i1 discharges from the first pad P1 to the second pad P2 in response to the discharge instruction signal from the first voltage detection circuit e1.

Next, other configurations of the first ESD protection circuit 2 are described.

The first noise filter circuit b1 is connected between the first pad P1 and the second pad P2 on the output side of the timer circuit a and on the input side of the first voltage detection circuit e1. In more detail, the first noise filter circuit b1 includes transistors Tr1, Tr2, Tr3, Tr4, Tr5, and Tr6 as illustrated in FIG. 2. The transistor Tr1 is connected to the first pad P1 at one end, to one end of the transistor Tr2 at the other end, and to the output node N1 at its gate. The transistor Tr1 is a pMOSFET in the example illustrated in FIG. 2. The transistor Tr2 is connected to an output node N2 at the other end and to the output node N1 at its gate. The transistor Tr2 is the same as the transistor Tr1 in the conductivity type. The transistor Tr3 is connected to the output node N2 at one end, to one end of the transistor Tr4 at the other end, and to the output node N1 at its gate. The transistor Tr3 is different from the transistor Tr2 in the conductivity type. The transistor Tr3 is an nMOSFET in the example illustrated in FIG. 2. The transistor Tr4 is connected to the second pad P2 at the other end and to the output node N1 at its gate. The transistor Tr4 is the same as the transistor Tr3 in the conductivity type. The transistor Tr5 is connected to the first pad P1 at one end, to one end of the transistor Tr2 at the other end, and to the output node N3 at its gate. The transistor Tr5 is the same as the transistor Tr1 in the conductivity type. The transistor Tr6 is connected to the other end of the transistor Tr3 at one end, to the second pad P2 at the other end, and to the output node N3 at its gate. The transistor Tr6 is the same as the transistor Tr4 in the conductivity type. The first noise filter circuit b1 is configured by a Schmitt trigger circuit, for example. The first noise filter circuit b1 inverts the logic of the control signal while suppressing an error of the control signal due to power supply noise. In more detail, the transistors Tr1, Tr4, Tr5, and Tr6 have a function of providing hysteresis for allowing the first ESD protection circuit 2 to stably operate when the voltage at the first pad P1 varies. The transistors Tr2 and Tr3 function as an inverter that receives the voltage at the output node N1 (the control signal) as an input and outputs a voltage having a logic level obtained by inverting the input.

The first buffer circuit c1 is connected between the first pad P1 and the second pad P2 on the output side of the first noise filter circuit b1 and on the input side of the first voltage detection circuit e1. In more detail, the first buffer circuit c1 includes transistors Tr7 and Tr8 as illustrated in FIG. 2. The transistor Tr7 is connected to the first pad P1 at one end, to an output node N3 at the other end, and to the output node N2 at its gate. The transistor Tr7 is a pMOSFET in the example illustrated in FIG. 2. The transistor Tr8 is connected to the output node N3 at one end, to the second pad P2 at the other end, and to the output node N2 at its gate. The transistor Tr8 is different from the transistor Tr7 in the conductivity type. The transistor Tr8 is an nMOSFET in the example illustrated in FIG. 2. The transistors Tr7 and Tr8 configure an inverter. The first buffer circuit c1 inverts the logic of the output signal of the first noise filter circuit b1, amplifies the output signal, and outputs a resultant signal.

The second noise filter circuit d1 is connected to the output side of the first buffer circuit c1 and the input side of the first voltage detection circuit e1. The second noise filter circuit d1 is an RC filter circuit including a resistor R2 and a capacitor C2 in the example illustrated in FIG. 2. The resistor R2 is connected to the output node N3 at one end and to an output node N4 at the other end. The capacitor C2 is connected to the output node N4 at one end and to the second pad P2 at the other end. The second noise filter circuit d1 suppresses an error of the output signal of the first buffer circuit c1 due to power supply noise.

The second buffer circuit f1 is connected between the first pad P1 and the second pad P2 on the output side of the first voltage detection circuit e1 and on the input side of the first discharge element i1. In more detail, the second buffer circuit f1 includes transistors Tr14 and Tr15 and a resistor R5. The transistor Tr14 is connected to the first pad P1 at one end, to one end of the resistor R5 at the other end, and to the output node N5 at its gate. The transistor Tr14 is a pMOSFET in the example illustrated in FIG. 2. The resistor R5 is connected to an output node N7 at the other end. The transistor Tr15 is connected to the output node N7 at one end, to the second pad P2 at the other end, and to the output node N5 at its gate. The transistor Tr15 is different from the transistor Tr14 in the conductivity type. The transistor Tr15 is an nMOSFET in the example illustrated in FIG. 2. The second buffer circuit f1 inverts the logic of the discharge instruction signal from the first voltage detection circuit e1, amplifies the signal, and outputs a resultant signal.

The third noise filter circuit g1 is connected to the output side of the second buffer circuit f1 and to the input side of the first discharge element i1. The third noise filter circuit g1 is an RC filter circuit including a resistor R6 and a capacitor C3 in the example illustrated in FIG. 2. The resistor R6 is connected to the output node N7 at one end and to an output node N8 at the other end. The capacitor C3 is connected to the output node N8 at one end and to the second pad P2 at the other end. The third noise filter circuit g1 suppresses an error of the output signal of the second buffer circuit f1 due to power supply noise.

The third buffer circuit h1 is connected between the first pad P1 and the second pad P2 on the output side of the third noise filter circuit g1 and on the input side of the first discharge element i1. In more detail, the third buffer circuit h1 includes transistors Tr16 and Tr17 as illustrated in FIG. 2. The transistor Tr16 is connected to the first pad P1 at one end, to an output node N9 at the other end, and to the output node N8 at its gate. The transistor Tr16 is a pMOSFET in the example illustrated in FIG. 2. The transistor Tr17 is connected to the output node N9 at one end, to the second pad P2 at the other end, and to the output node N8 at its gate. The transistor Tr17 is different from the transistor Tr16 in the conductivity type. The transistor Tr17 is an nMOSFET in the example illustrated in FIG. 2.

The transistors Tr16 and Tr17 configure an inverter. The third buffer circuit h1 inverts the logic of the output signal of the third noise filter circuit g1, amplifies the output signal, and outputs a resultant signal. The output signal of the third buffer circuit h1 is input to the gate of the first discharge element i1.

Meanwhile, the second ESD protection circuit 3 is configured by a discharge circuit connected between the third pad P3 and the fourth pad P4 on the output side of the timer circuit a as illustrated in FIG. 2. The third pad P3 is connected to the power supply potential (VCCQ). The third pad P3 is connected to the protected circuit 4 via a third power supply line L3. The fourth pad P4 is connected to the reference potential (VSS). The fourth pad P4 is connected to the protected circuit 4 via a fourth power supply line L4. The second ESD protection circuit 3 discharges from the third pad P3 to the fourth pad P4 when a voltage between the third pad P3 and the fourth pad P4 exceeds a second threshold voltage. The second ESD protection circuit 3 does not discharge from the third pad P3 to the fourth pad P4 when a voltage between the third pad P3 and the fourth pad P4 does not exceed the second threshold voltage. The second threshold voltage may be the same as or different from the first threshold voltage. The second ESD protection circuit 3 includes a fourth noise filter circuit b2, a fourth buffer circuit c2, a fifth noise filter circuit d2, a second voltage detection circuit e2, a fifth buffer circuit f2, a sixth noise filter circuit g2, a sixth buffer circuit h2, and a second discharge element i2.

The fourth noise filter circuit b2 is connected between the third pad P3 and the fourth pad P4 on the output side of the timer circuit a and on the input side of the second voltage detection circuit e2. Since circuit elements of the fourth noise filter circuit b2 are identical to those of the first noise filter circuit b1, the circuit elements of the fourth noise filter circuit b2 are denoted by like reference signs, and redundant explanations thereof are omitted. Meanwhile, the input end of the fourth noise filter circuit b2 of the second ESD protection circuit 3 is connected to the output end N1 of the timer circuit a of the first ESD protection circuit 2 via a signal sharing line SSL across the second power supply line L2 connected to the second pad P2 and the third power supply line L3 connected to the third pad P3. The fourth noise filter circuit b2 of the second ESD protection circuit 3 inverts the logic of the control signal of the timer circuit of the first ESD protection circuit 2 a while suppressing an error of the control signal due to power supply noise.

The fourth buffer circuit c2 is connected between the third pad P3 and the fourth pad P4 on the output side of the fourth noise filter circuit b2 and on the input side of the second voltage detection circuit e2. Since circuit elements of the fourth buffer circuit c2 are identical to those of the first buffer circuit c1, the circuit elements of the fourth buffer circuit c2 are denoted by like reference signs, and redundant explanations thereof are omitted. The fourth buffer circuit c2 inverts the logic of the output voltage of the fourth noise filter circuit b2 and amplifies the output voltage.

The fifth noise filter circuit d2 is connected to the output side of the fourth buffer circuit c2 and to the input side of the second voltage detection circuit e2. Since circuit elements of the fifth noise filter circuit d2 are identical to those of the second noise filter circuit d1, the circuit elements of the fifth noise filter circuit d2 are denoted by like reference signs, and redundant explanations thereof are omitted. The fifth noise filter circuit d2 suppresses an error of the output signal of the fourth buffer circuit c2 due to power supply noise.

The second voltage detection circuit e2 is connected between the third pad P3 and the fourth pad P4 on the output side of the timer circuit a, in more detail, the output side of the fifth noise filter circuit d2. Since circuit elements of the second voltage detection circuit e2 are identical to those of the first voltage detection circuit e1, the circuit elements of the second voltage detection circuit e2 are denoted by like reference signs, and redundant explanations thereof are omitted. The second voltage detection circuit e2 operates based on the control signal from the timer circuit a and outputs a discharge instruction signal when a voltage between the third pad P3 and the fourth pad P4 exceeds the second threshold voltage.

The fifth buffer circuit f2 is connected between the third pad P3 and the fourth pad P4 on the output side of the second voltage detection circuit e2 and on the input side of the second discharge element i2. Since circuit elements of the fifth buffer circuit f2 are identical to those of the second buffer circuit f1, the circuit elements of the fifth buffer circuit f2 are denoted by like reference signs, and redundant explanations thereof are omitted. The fifth buffer circuit f2 inverts the logic of the discharge instruction signal from the second voltage detection circuit e2 and amplifies the signal.

The sixth noise filter circuit g2 is connected to the output side of the fifth buffer circuit f2 and to the input side of the second discharge element i2. Since circuit elements of the sixth noise filter circuit g2 are identical to those of the third noise filter circuit g1, the circuit elements of the sixth noise filter circuit g2 are denoted by like reference signs, and redundant explanations thereof are omitted. The sixth noise filter circuit g2 suppresses an error of the output signal of the fifth buffer circuit f2 due to power supply noise.

The sixth buffer circuit h2 is connected between the third pad P3 and the fourth pad P4 on the output side of the sixth noise filter circuit g2 and on the input side of the second discharge element i2. Since circuit elements of the sixth buffer circuit h2 are identical to those of the third buffer circuit h1, the circuit elements of the sixth buffer circuit h2 are denoted by like reference signs, and redundant explanations thereof are omitted. The sixth buffer circuit h2 inverts the logic of the output signal of the sixth noise filter circuit g2 and amplifies the output signal. The output signal of the sixth buffer circuit h2 is input to the gate of the second discharge element i2.

The second discharge element i2 is configured by an nMOSFET, as with the first discharge element i1. The second discharge element i2 discharges from the third pad P3 to the fourth pad P4 in response to the output signal of the sixth buffer circuit h2 based on the discharge instruction signal from the second voltage detection circuit e2.

In order to make a protection circuit (an RCTMOS circuit) operate with favorable electrical characteristics, it is desirable to arrange the protection circuit near a power supply pad and an input/output pad in a chip. However, it is difficult to arrange the protection circuit near the pads because of a demand for reduction in pad pitch in association with a recent demand for reduction in chip size. However, according to the first embodiment, the timer circuit a having a large area, that is, a large time constant can be shared between the first ESD protection circuit 2 and the second ESD protection circuit 3. In other words, a timer circuit can be omitted in the second ESD protection circuit 3. By sharing the timer circuit a, the size of the second ESD protection circuit 3 (that is, the circuit area) can be reduced while the number of the arranged protection circuits 2 and 3 is maintained. Accordingly, it is possible to arrange the first ESD protection circuit 2 and the second ESD protection circuit 3 near the power supply pads P1 and P3 and the input/output pads PIO1 and PIO2 irrespective of reduction in pad pitch. Consequently, favorable electrical characteristics of the first ESD protection circuit 2 and the second ESD protection circuit 3 can be surely obtained in the small semiconductor device 1.

Second Embodiment

Figure 3:
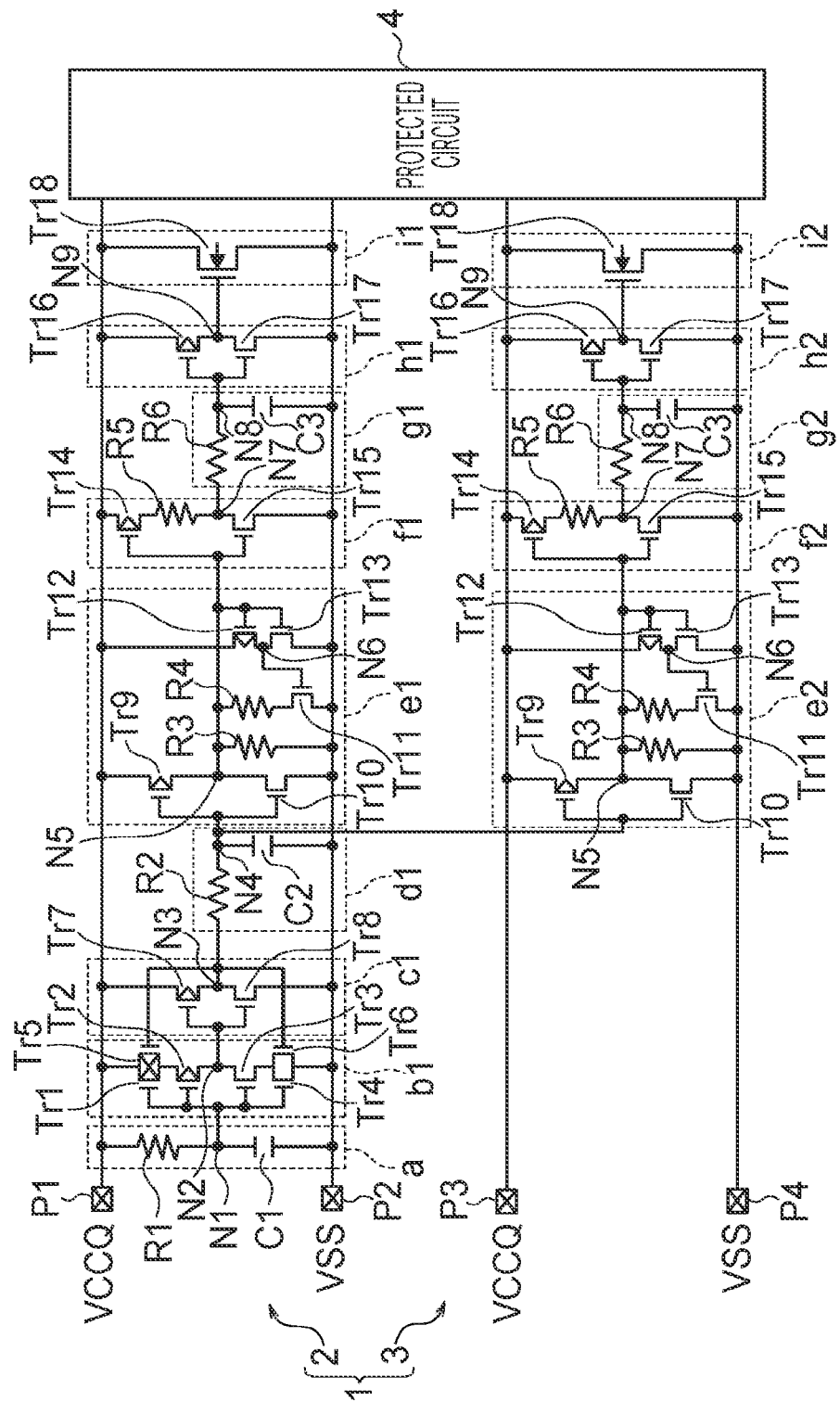
FIG. 3 is a circuit diagram of a first ESD protection circuit and a second ESD protection circuit in a semiconductor device according to a second embodiment.

FIG. 3 is a circuit diagram of the semiconductor device 1 according to a second embodiment. The semiconductor device 1 according to the second embodiment is different from the semiconductor device 1 according to the first embodiment in that the fourth noise filter circuit b2, the fourth buffer circuit c2, and the fifth noise filter circuit d2 are further omitted in the second ESD protection circuit 3. The input end of the second voltage detection circuit e2 of the second ESD protection circuit 3 is connected to the output end N4 of the second noise filter circuit d1 of the first ESD protection circuit 2 via a signal sharing line SSL across the second power supply line L2 connected to the second pad P2 and the third power supply line L3 connected to the third pad P3.

According to the second embodiment, the timer circuit a, the first noise filter circuit b1, the first buffer circuit c1, and the second noise filter circuit d1 can be shared between the first ESD protection circuit 2 and the second ESD protection circuit 3. Accordingly, the size of the second ESD protection circuit 3 can be further reduced as compared with that in the first embodiment.

Third Embodiment

Figure 4:
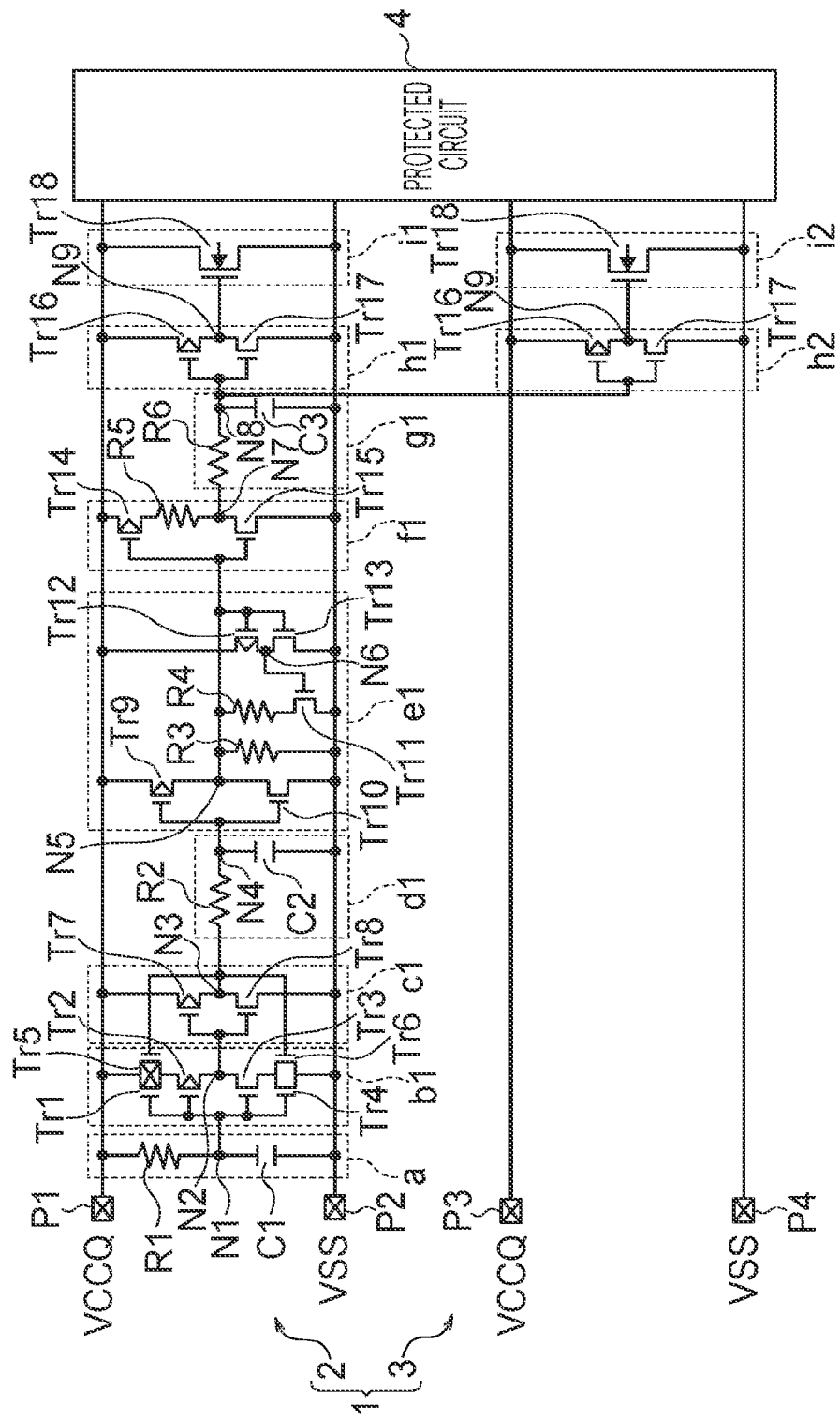
FIG. 4 is a circuit diagram of a first ESD protection circuit and a second ESD protection circuit in a semiconductor device according to a third embodiment.

FIG. 4 is a circuit diagram of the semiconductor device 1 according to a third embodiment. The semiconductor device 1 according to the third embodiment is different from the semiconductor device 1 according to the second embodiment in that the second voltage detection circuit e2, the fifth buffer circuit f2, and the sixth noise filter circuit g2 are further omitted in the second ESD protection circuit 3. The input end of the sixth buffer circuit h2 of the second ESD protection circuit 3 is connected to the output end N8 of the third noise filter circuit g1 of the first ESD protection circuit 2 via a signal sharing line SSL across the second power supply line L2 connected to the second pad P2 and the third power supply line L3 connected to the third pad P3. In this configuration, the second discharge element i2 discharges from the third pad P3 to the fourth pad P4 in response to a discharge instruction signal from the first voltage detection circuit e1.

According to the third embodiment, the timer circuit a, the first noise filter circuit b1, the first buffer circuit c1, the second noise filter circuit d1, the first voltage detection circuit e1, the second buffer circuit f1, and the third noise filter circuit g1 can be shared between the first ESD protection circuit 2 and the second ESD protection circuit 3. Accordingly, the size of the second ESD protection circuit 3 can be further reduced as compared with that in the second embodiment.

FIG. 5A is a schematic cross-sectional view illustrating the layout of the first ESD protection circuit 2 and the second ESD protection circuit 3 in a semiconductor device 10 according to a comparative example of the third embodiment. FIG. 5B is a schematic cross-sectional view illustrating the layout of the first ESD protection circuit 2 and the second ESD protection circuit 3 in the semiconductor device 1 according to the third embodiment.

As illustrated in FIG. 5A, two input/output pads and a power supply pad between the input/output pads are provided to correspond to each of the first ESD protection circuit 2 and the second ESD protection circuit 3. In the example illustrated in FIG. 5A, the first input/output pad PIO1, the second input/output pad PIO2, and the first pad P1 between the input/output pads PIO1 and PIO2 are provided to correspond to the first ESD protection circuit 2. Further, the third input/output pad PIO3, the fourth input/output pad PIO4, and the third pad P3 between the input/output pads PIO3 and PIO4 are provided to correspond to the second ESD protection circuit 3. However, in a case where no circuit element is shared between the first ESD protection circuit 2 and the second ESD protection circuit 3 as illustrated in FIG. 5A, it is necessary to provide a resistor element r1 or r2, a control part CNT1 or CNT2 (a transistor), and a discharge transistor (Tr) part for each of the first and second ESD protection circuits 2 and 3, as circuit elements unique to the protection circuit 2 or 3. Therefore, when the pitch of the input/output pads PIO1 and PIO2 or PIO3 and PIO4 and the power supply pad P1 or P3 is made narrow, it is difficult to arrange the protection circuits 2 and 3 to correspond to these pads.

Meanwhile, according to the third embodiment, circuit elements other than a discharge transistor part can be shared between the first ESD protection circuit 2 and the second ESD protection circuit 3 as illustrated in FIG. 5B. It is thus possible to appropriately arrange the protection circuits 2 and 3 to correspond to the pads arranged with a reduced pitch.

Further, according to the third embodiment, the first voltage detection circuit e1 configured by a ratio circuit can be shared between the first ESD protection circuit 2 and the second ESD protection circuit 3, whereby the total number of ratio circuits can be reduced. By reducing the total number of ratio circuits, it is possible to reduce the total amount of a flow-through current (a peak current) generated in the ratio circuits at normal power-on, not in an ESD test.

Fourth Embodiment

Figure 6:
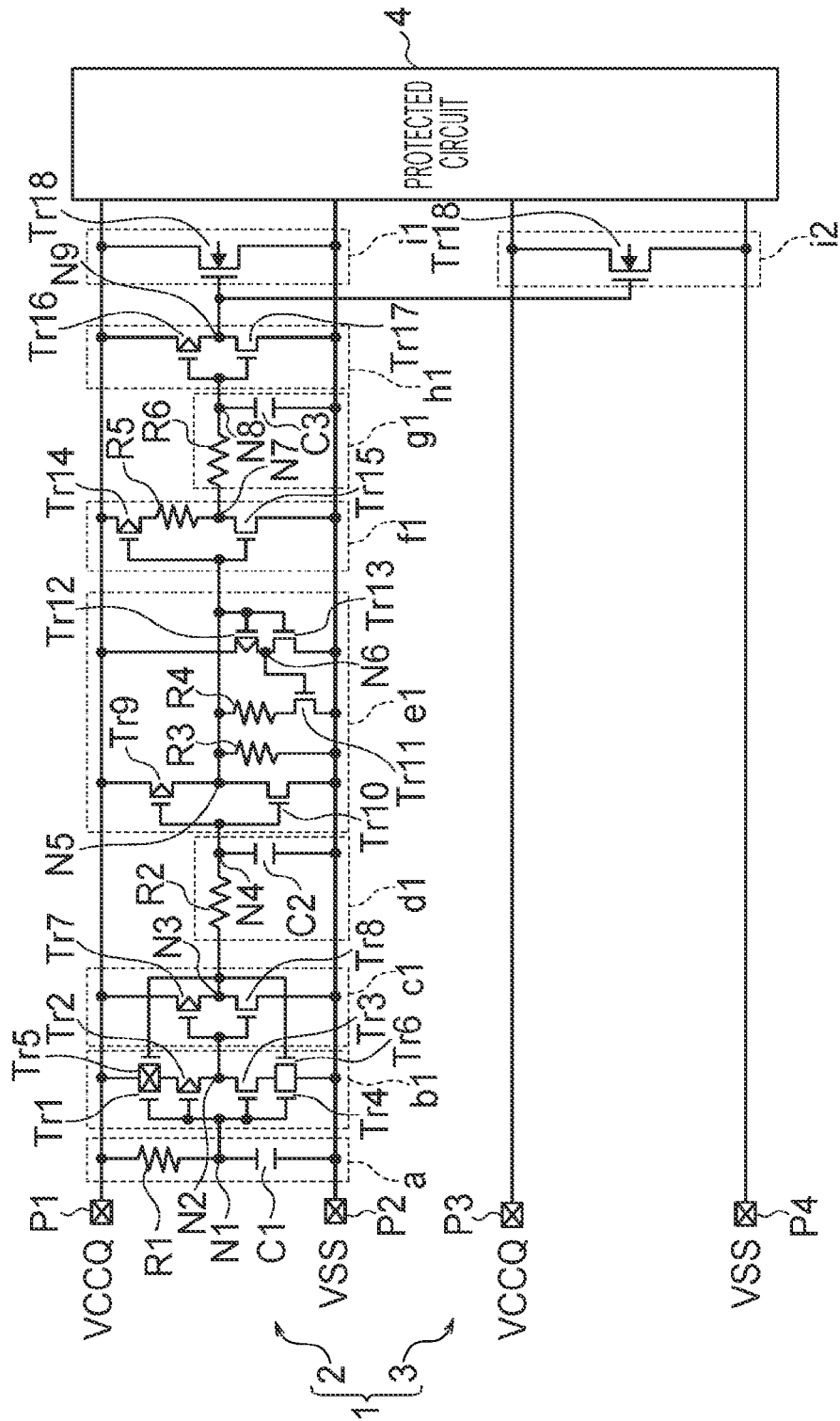
FIG. 6 is a circuit diagram of a first ESD protection circuit and a second ESD protection circuit in a semiconductor device according to a fourth embodiment.

FIG. 6 is a circuit diagram of the semiconductor device 1 according to a fourth embodiment. The semiconductor device 1 according to the fourth embodiment is different from the semiconductor device 1 according to the third embodiment in that the sixth buffer circuit h2 is further omitted in the second ESD protection circuit 3. The input end of the second discharge element i2 of the second ESD protection circuit 3 is connected to the output end of the third buffer circuit h1 of the first ESD protection circuit 2 via a signal sharing line SSL across the second power supply line L2 connected to the second pad P2 and the third power supply line L3 connected to the third pad P3. In this configuration, the second discharge element i2 discharges from the third pad P3 to the fourth pad P4 in response to a discharge instruction signal from the first voltage detection circuit e1.

According to the fourth embodiment, the timer circuit a, the first noise filter circuit b1, the first buffer circuit c1, the second noise filter circuit d1, the first voltage detection circuit e1, the second buffer circuit f1, the third noise filter circuit g1, and the third buffer circuit h1 can be shared between the first ESD protection circuit 2 and the second ESD protection circuit 3. Accordingly, the size of the second ESD protection circuit 3 can be further reduced as compared with that in the third embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor device comprising a first protection circuit and a second protection circuit for protecting a protected circuit,
the first protection circuit comprising
a timer circuit connected between a first pad connected to a power supply potential and a second pad connected to a reference potential and configured to output a control signal for controlling operation periods of the first protection circuit and the second protection circuit,
a voltage detection circuit connected between the first pad and the second pad on an output side of the timer circuit and configured to operate based on the control signal and output a discharge instruction signal when a voltage between the first pad and the second pad exceeds a first threshold voltage, and
a discharge element connected between the first pad and the second pad on an output side of the voltage detection circuit and configured to discharge from the first pad to the second pad in response to the discharge instruction signal, and
the second protection circuit comprising a discharge circuit connected between a third pad connected to the power supply potential and a fourth pad connected to the reference potential on the output side of the timer circuit and configured to discharge from the third pad to the fourth pad when a voltage between the third pad and the fourth pad exceeds a second threshold voltage.

2. The device of claim 1, wherein
the second threshold voltage is same as the first threshold voltage, and
the discharge circuit includes a second discharge element connected between the third pad and the fourth pad on the output side of the voltage detection circuit and configured to discharge from the third pad to the fourth pad in response to the discharge instruction signal.

3. The device of claim 2, wherein the first protection circuit further comprises
a first noise filter circuit connected between the first pad and the second pad on the output side of the timer circuit and on an input side of the voltage detection circuit and configured to invert a logic of the control signal while suppressing an error of the control signal due to power supply noise,
a first buffer circuit connected between the first pad and the second pad on an output side of the first noise filter circuit and on the input side of the voltage detection circuit and configured to invert a logic of an output signal of the first noise filter circuit and amplify the output signal of the first noise filter circuit, and
a second noise filter circuit connected to an output side of the first buffer circuit and the input side of the voltage detection circuit and configured to suppress an error of an output signal of the first buffer circuit due to the power supply noise.

4. The device of claim 3, wherein
the first protection circuit further comprises
a second buffer circuit connected between the first pad and the second pad on the output side of the voltage detection circuit and on an input side of the discharge element and configured to invert a logic of the discharge instruction signal and amplify the discharge instruction signal,
a third noise filter circuit connected to an output side of the second buffer circuit and the input side of the discharge element and configured to suppress an error of an output signal of the second buffer circuit due to the power supply noise, and
a third buffer circuit connected between the first pad and the second pad on an output side of the third noise filter circuit and on the input side of the discharge element and configured to invert a logic of an output signal of the third noise filter circuit and amplify the output signal of the third noise filter circuit, and
the discharge circuit further includes a sixth buffer circuit connected between the third pad and the fourth pad on the output side of the third noise filter circuit and on an input side of the second discharge element and configured to invert the logic of the output signal of the third noise filter circuit and amplify the output signal of the third noise filter circuit.

5. The device of claim 1, wherein the discharge circuit comprises
a second voltage detection circuit connected between the third pad and the fourth pad on the output side of the timer circuit and configured to operate based on the control signal and output a second discharge instruction signal when a voltage between the third pad and the fourth pad exceeds the second threshold voltage, and
a second discharge element connected between the third pad and the fourth pad on an output side of the second voltage detection circuit and configured to discharge from the third pad to the fourth pad in response to the second discharge instruction signal.

6. The device of claim 5, wherein the first protection circuit further comprises
a first noise filter circuit connected between the first pad and the second pad on the output side of the timer circuit and on an input side of the voltage detection circuit and configured to invert a logic of the control signal while suppressing an error of the control signal due to power supply noise,
a first buffer circuit connected between the first pad and the second pad on an output side of the first noise filter circuit and on the input side of the voltage detection circuit and configured to invert a logic of an output signal of the first noise filter circuit and amplify the output signal of the first noise filter circuit,
a second noise filter circuit connected to an output side of the first buffer circuit and the input side of the voltage detection circuit and configured to suppress an error of an output signal of the first buffer circuit due to the power supply noise,
a second buffer circuit connected between the first pad and the second pad on the output side of the voltage detection circuit and on an input side of the discharge element and configured to invert a logic of the discharge instruction signal and amplify the discharge instruction signal, a third noise filter circuit connected to an output side of the second buffer circuit and the input side of the discharge element and configured to suppress an error of an output signal of the second buffer circuit due to the power supply noise, and a third buffer circuit connected between the first pad and the second pad on an output side of the third noise filter circuit and on the input side of the discharge element and configured to invert a logic of an output signal of the third noise filter circuit and amplify the output signal of the third noise filter circuit.

7. The device of claim 6, wherein the second protection circuit further comprises a fourth noise filter circuit connected between the third pad and the fourth pad on the output side of the timer circuit and on an input side of the second voltage detection circuit and configured to invert a logic of the control signal while suppressing an error of the control signal due to the power supply noise, a fourth buffer circuit connected between the third pad and the fourth pad on an output side of the fourth noise filter circuit and on the input side of the second voltage detection circuit and configured to invert a logic of an output voltage of the fourth noise filter circuit and amplify the output signal of the fourth noise filter circuit, a fifth noise filter circuit connected to an output side of the fourth buffer circuit and the input side of the second voltage detection circuit and configured to suppress an error of an output signal of the fourth buffer circuit due to the power supply noise, a fifth buffer circuit connected between the third pad and the fourth pad on the output side of the second voltage detection circuit and on an input side of the second discharge element and configured to invert a logic of the second discharge instruction signal and amplify the second discharge instruction signal, a sixth noise filter circuit connected to an output side of the fifth buffer circuit and the input side of the second discharge element and configured to suppress an error of an output signal of the fifth buffer circuit due to the power supply noise, and a sixth buffer circuit connected between the third pad and the fourth pad on an output side of the sixth noise filter circuit and on the input side of the second discharge element and configured to invert a logic of an output signal of the sixth noise filter circuit and amplify the output signal of the sixth noise filter circuit.

8. The device of claim 1, wherein
the first protection circuit is further connected to a first input/output pad and a second input/output pad each connected to the protected circuit, and the first pad is arranged between the first input/output pad and the second input/output pad.

9. The device of claim 1, wherein
the second protection circuit is further connected to a third input/output pad and a fourth input/output pad each connected to the protected circuit, and the third pad is arranged between the third input/output pad and the fourth input/output pad.

10. The device of claim 1, wherein
the timer circuit comprises
a resistor connected to the first pad at one end and to a first output node at the other end, and a capacitor connected to the first output node at one end and to the second pad at the other end.

11. The device of claim 10, wherein the voltage detection circuit comprises
a first transistor connected to the first pad at one end, to a second output node at the other end, and to a side of the first output node at a gate, a second transistor connected to the second output node at one end, to the second pad at the other end, and to the side of the first output node at a gate and being different from the first transistor in conductivity type, a third transistor connected to the second output node at one end, to the second pad at the other end, and to a third output node at a gate, a fourth transistor connected to the first pad at one end, to the third output node at the other end, and to the second output node at a gate, and a fifth transistor connected to the third output node at one end, to the second pad at the other end, and to the second output node at a gate and being different from the fourth transistor in conductivity type.

12. The device of claim 11, wherein the discharge element includes a sixth transistor connected to the first pad at one end, to the second pad at the other end, and to a side of the second output node at a gate.

13. The device of claim 1, further comprising:
a signal sharing line connected between the first protection circuit and the second protection circuit through which the control signal is transmitted, wherein, the first protection circuit includes a first power supply line connected between the first pad and the protected circuit, and a second power supply line connected between the second pad and the protected circuit, the second protection circuit includes a third power supply line connected between the third pad and the protected circuit, and a fourth power supply line connected between the fourth pad and the protected circuit, and the signal sharing line extends across the second power supply line and the third power supply line.

* * * * *